United States Patent [19]

Scarpino

[11] Patent Number: 4,716,778
[45] Date of Patent: Jan. 5, 1988

[54] MANUAL, MULTI-RATIO TRANSMISSION

[76] Inventor: Christopher Scarpino, R.D. No. 3, Box 201, Leventry Rd., Johnstown, Pa. 15904

[21] Appl. No.: 872,000

[22] Filed: May 20, 1986

Related U.S. Application Data

[63] Continuation-in-part of Ser. No. 694,331, Jan. 24, 1985, abandoned.

[51] Int. Cl.$^4$ .............................................. F16H 3/08
[52] U.S. Cl. ...................................................... 74/371
[58] Field of Search ................ 74/332, 333, 359, 361, 74/360, 341, 348, 349, 372, 371, 801, 805, 192

[56] References Cited

U.S. PATENT DOCUMENTS

| | | | |
|---|---|---|---|
| 765,956 | 7/1904 | Bucknam | 74/192 |
| 1,661,892 | 3/1928 | Girones | 74/371 |
| 1,884,595 | 10/1932 | Moxley | 74/371 |
| 2,045,835 | 6/1936 | Coen | 74/371 |
| 2,273,807 | 2/1942 | Woytych | 74/371 |
| 2,600,586 | 6/1952 | Spencer | 74/332 |
| 3,463,028 | 2/1968 | Polidor | 74/371 |
| 3,600,962 | 8/1971 | Ivanchich | 74/371 |
| 3,640,150 | 2/1972 | Leiner et al. | 74/801 |
| 4,452,102 | 6/1984 | Shaffer | 74/805 |
| 4,505,164 | 3/1985 | Yoshida | 74/371 |

Primary Examiner—Leslie Braun
Assistant Examiner—David Novais

[57] ABSTRACT

A variable speed transmission is disclosed wherein two convergent, conical gear trains simultaneously increase in circumference such that the parallel expansion of the convergent gear trains produces a corresponding efficiency increase which constitutes a principle of operation for the generation of ratios. A Driven Shell having convergently disposed input Gears is driven by the gears such that the Driven Shell and Input Gears form the set of convergent cones.

A shifting means comprising a Shifting Control Slide is tracked to a fixed, Stabilizing Shaft disposed within a hollow, Helical Control Drum. Whereby, the Stabilizing Shaft prevents inadvertent rotational motion of the Slide, such that two Carriage Indexing Pins, integral with the Slide engage the Double Lead Helical Slots formed in the Control Drum, and being so driven by rotation of the Slots, aligns the Carriage surrounding the Control Drum such that movement in the Carriage locates a Power Engagement Mechanism via a Carriage Bearing to index the Input Gears.

An Input Power Shaft, comprising two Input Power Drums is joined via six Roller Guides. Rotation of the Input Power Shaft is translated through the Input Gears to drive the Driven Shell.

1 Claim, 3 Drawing Figures

MANUAL, MULTI-RATIO TRANSMISSION

This application is a continuation in part of Ser. No. 694,331 art group 352, filed Jan. 24, 1985, now abandoned.

This invention relates to a compact, manual transmission capable of generating variable ratios and selectively transferring power from an Input Power Shaft to a Driven Shell. The device relies upon a novel means for generating variable ratios by utilizing two convergent, gear driven cones. The parallel expansion in diameter of the two convergent cones provides for an efficiency increase along the Input Power Shaft Assembly, Input Gear Cluster and the Driven Shell which comprise the two cones, such that this principle can be utilized as a means for generating ratio within the device. Accordingly, the device of this invention embodies a novel operating principle resulting from the utilization of convergent cones. Wherein, as the circumference of the gears increases, efficiency increases, such that an increase in circumference is directly proportional to an increase in efficiency.

Accordingly, it is an object of this invention to provide a compact and highly efficient transmission system embodying a novel operating principle.

It is another object of this invention to provide a versatile and compact transmission wherein the distance necessary to transfer power has been reduced via the utilization of two expanding and convergent, conical internal-gear trains, as opposed to crossing, intersecting or inverted conical gear trains.

It is still another object of this invention to provide a means of generating variable ratios within the device whereby two convergent internal-gear trains embody the novel operating principle.

It is a further object of this invention to provide for an internal shifting assembly wherein a fixed, Stabilizing Shaft is disposed within a hollow, Helical Control Drum. A Shifting Control Slide, containing integral Carriage Indexing Pins, is mounted coaxially on the Stabilizing Shaft. Helical Slots, machined through the walls of the Helical Control Drum, direct the Carriage Indexing Pins to engage Key Ways formed in the Carriage which surrounds the Helical Control Drum. The Carriage controls lateral motion in the Power Engagement Mechanism. The Lugs of the Power Engagement Mechanism project through the Roller Guides of the Power Input Shaft Assembly and engage the Lateral Slots formed into the Input Gears. Thus, selectively transferring power from the Power Input Shaft Assembly to the Input Gears.

These and other objects will become readily apparent with reference to the drawings and following description wherein.

Figure 1:
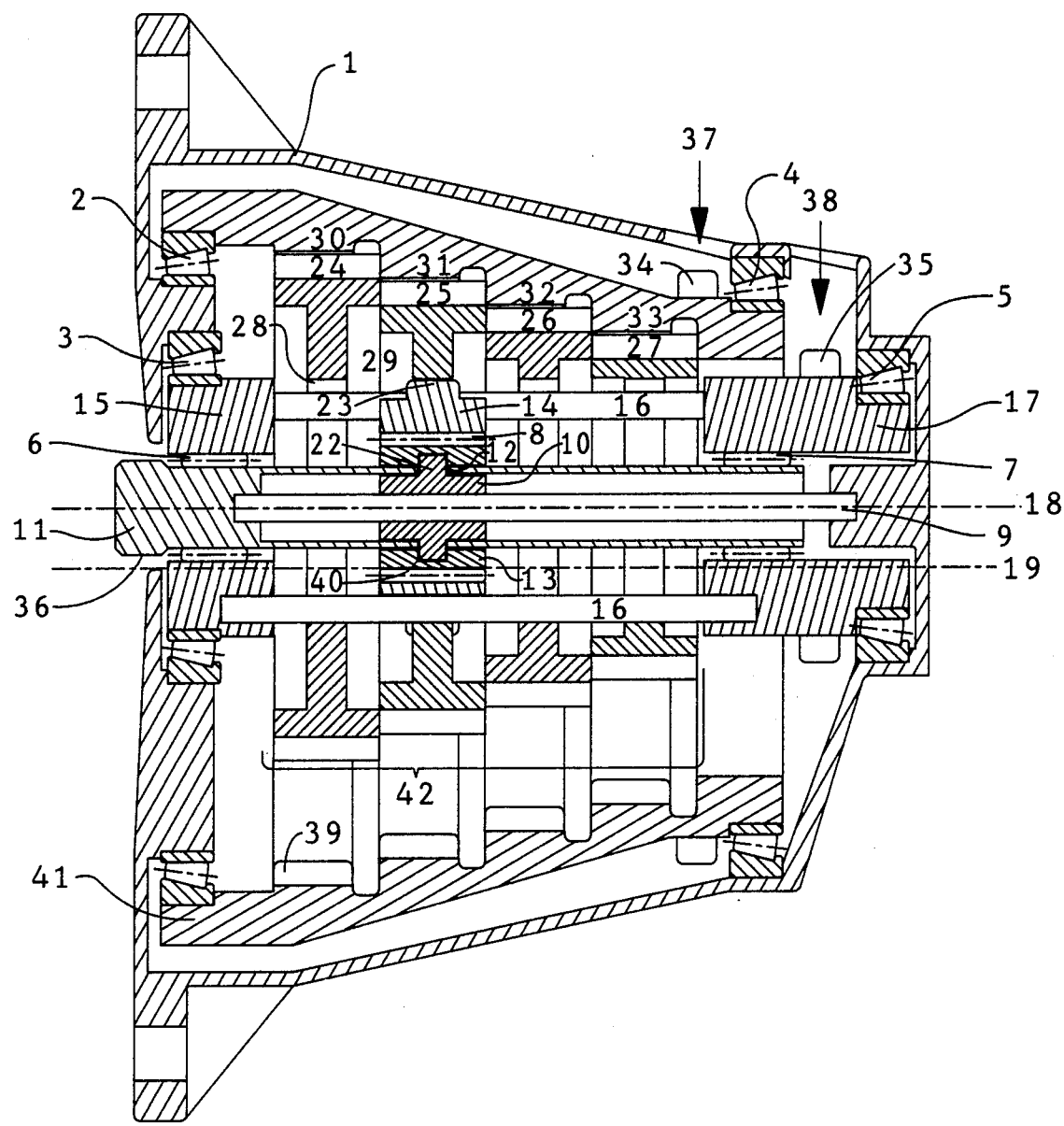
FIG. 1 is a cross-sectional assembly view of the device of this invention.

With attention to the drawings and to FIG. 1 in particular, the device of this invention includes a conical, Driven Shell 41 which also serves as the power output shaft. Internally stepped Gear Platforms 30 thru 33 holding internally cut Gear Teeth 39 are arranged conically from the smallest to the largest diameters. The Input Power Shaft Assembly 30, composed of the Input Power Shaft Drums 15 and 17, Roller Guides 16, Input Power Shaft Assembly Drive Gear 35 and the Input Gears 24 thru 27 are located eccentrically within the Driven Shell 41. The Driven Shell 41 may be monolithic or segmented (not shown) as determined by manufacturing considerations. Furthermore, the drawings herein show four input Gears 24 thru 27 and four Gear Platforms 30 thru 33. It will be obvious to those skilled in the art that the invention is not intended to be limited to the number of gears shown herein.

Figure 2:
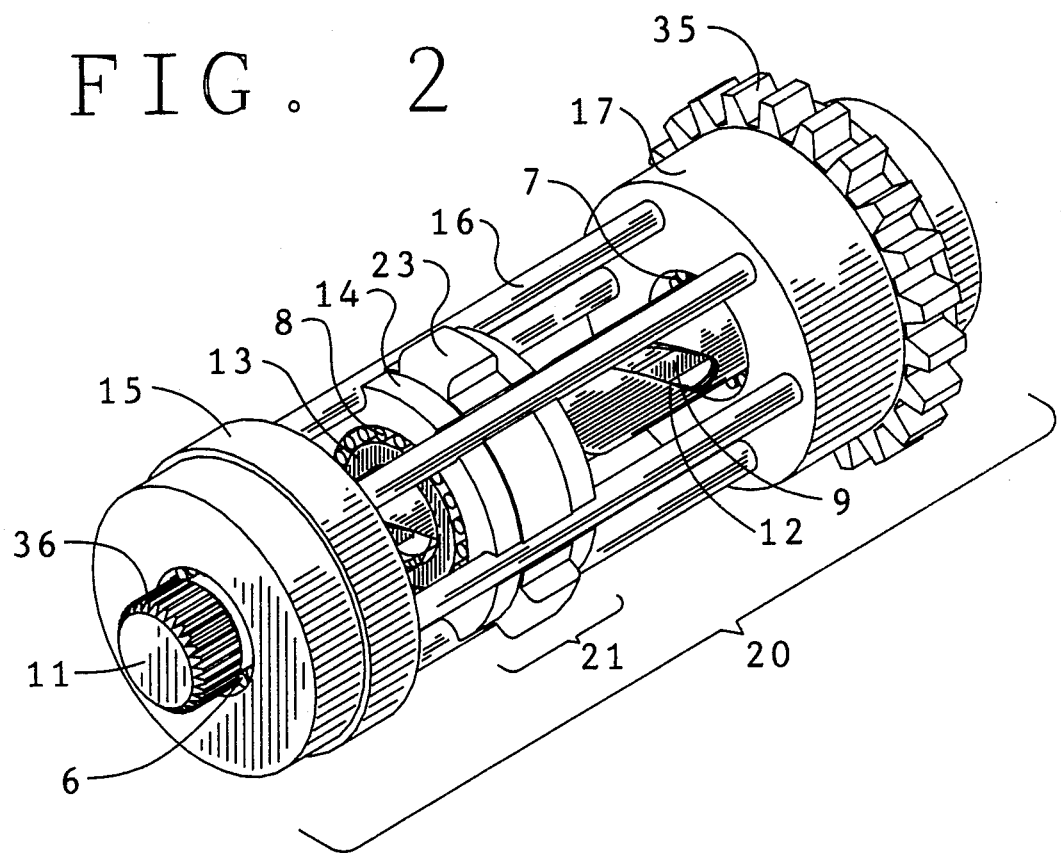
FIG. 2 is a pictorial view of the Power Input Shaft and Shifting Assemblies.
Figure 3:
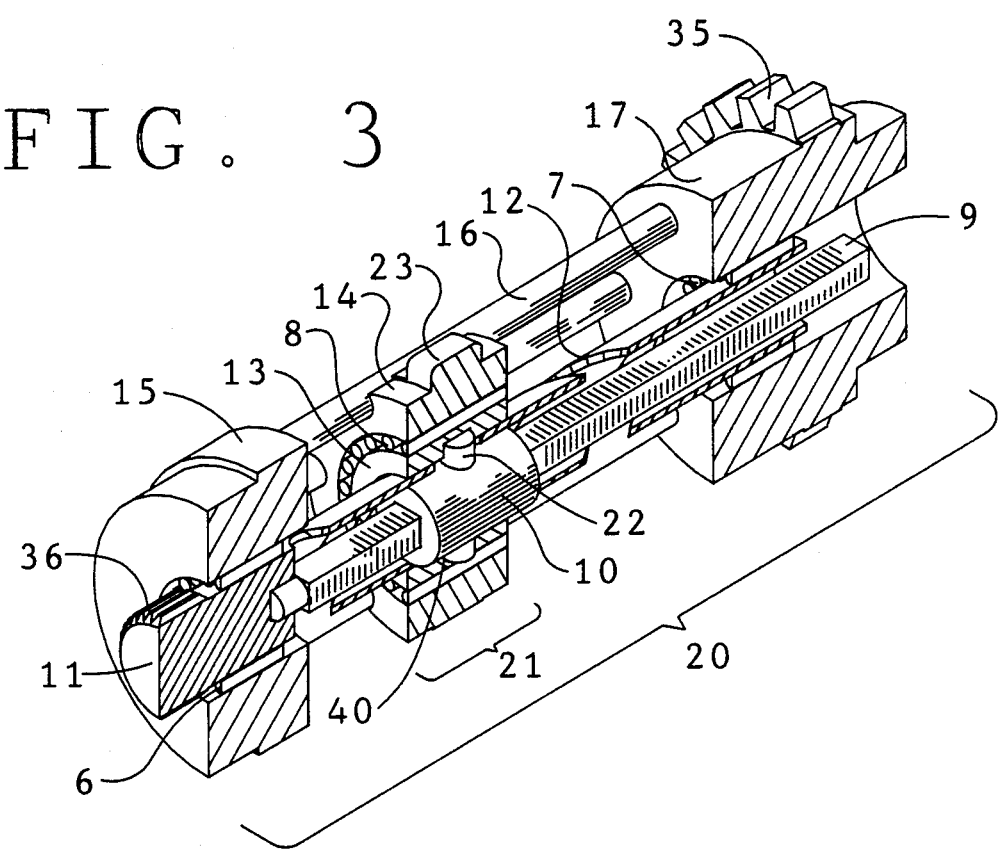
FIG. 3 is a pictorial, cross-sectional view of the Power Input Shaft and Shifting Assemblies.

As shown in FIGS. 1-2 and 3, the Input Power Shaft Assembly 20, composed of Input Power Shaft Drums 15 and 17, Roller Guides 16 and Input Power Shaft Assembly Drive Gear 35, incorporates a bearing housing at each end of the Shifting Assembly 21. Bearings 2 thru 7 support the Driven Shell 41, Input Power Shaft Assembly 20 and Helical Control Drum 11. The two cylindrical Input Power Shaft Drums 15 and 17 are joined via six Roller Guides 16 which form a cage on which the input Gears 24 thru 27 rotate. The Input Gears 24 thru 27, which freely rotate on the Roller Guides 16, form the inner cone or Input Gear Cluster 42 which is so located as to maintain the constant mesh of each Input Gear 24 thru 27 with a respective Gear Platform 30 thru 33 within the Driven Shell 41. The Input Power Shaft Assembly 20 and Input Gears 24 thru 27 comprising the Input Gear Cluster 42, are coaxially mounted and eccentrically disposed within the Driven Shell 41 such that the Axis 18 of the Input Gear Cluster 42 and the Axis 19 of the Driven Shell 41 are parallel. In addition, the inner cone formed by the Input Gear Cluster 42 and the outer cone formed by the Driven Shell 41 are convergent. The Axis 18 of the Input Power Shaft Assembly 20 is then located eccentrically to the Axis 19 of the Driven Shell 41 such that the angular plane formed by the internal engagement of two right circular cones; the Input Gear Cluster 42 and the Driven Shell 41, are of matching angle and direction. Thus, forming two convergent, as opposed to divergent, cones.

As shown in FIGS. 2-3, the Input Power Shaft Assembly 20 carries within it a Shifting Assembly 21 composed of a Stabilizing Shaft 9, a Shifting Control Slide 10, Carriage Indexing Pins 22, a Helical Control Drum 11 with a Double Lead Helical Slot 12, a Carriage 13, A Carriage Bearing 8, a Power Engagment Mechanism 14 and lugs 23. The Shifting Assembly 21 selectively transfers power through the Input Power Shaft Assembly 20 to selected Input Gears 24 thru 27. Shifting through the Input Gears 24 thru 27 is accomplished by a hollow, Helical Control Drum 11 mounted coaxially within the Input Power Shaft Assembly 20. A Double Lead Helical Slot 12, machined through the wall of the Helical Control Drum 11, directs the Power Engagement Mechanism 14 via the Carriage Indexing Pins 22 mounted on the Shifting Control Slide 10 to engage selected Input Gears 24 thru 27.

As shown in FIGS. 2-3, a Stabilizing Shaft 9, affixed to the surrounding Case 1, is disposed coaxially within the Helical Control Drum 11. The square Stabilizing Shaft 9 is so shaped as to prevent inadvertent rotational movement of the Shifting Control Slide 10 which surrounds the Stabilizing Shaft 9. The rectangular inner surface of the Shifting Control Slide 10 is shaped to coincide with that of the Stabilizing Shaft 9. It will be obvious to those skilled in the art that the Stabilizing Shaft 9 is not intended to be limited to the shape shown herein.

As shown in FIGS. 2-3, the Carriage Indexing Pins 22 of the Shifting Control Slide 10 extend through the Double Lead Helical Slot 12 of the Helical Control Drum 11 to engage a circular Carriage 13 surrounding the Helical Control Drum 11. Rotation of the Helical Control Drum 11 is accomplished via Splines 36 machined into an accessible surface of the Helical Control Drum 11 projecting beyond the surrounding the Case 1 and connected to an external selector mechanism (not shown).

The Carriage 13, containing a Carriage Bearing 8, mounted within the Power Engagement Mechanism 14, surrounds the Helical Control Drum 11. The inner surface of the Carriage 13 contains a Key Way 40, interlocking the Carriage 13 to the Carriage Indexing Pins 22 of the Shifting Control Slide 10.

Lateral movement of the Carriage 13 among the Input Gears 24 thru 27 is accomplished through lateral movement of the Shifting Control Slide 10 as directed by rotation of the Double Lead Helical Slot 12 formed in the Helical Control Drum 11. Through the Carriage 13 and Carriage Bearing 8, the Shifting Control Slide 10 directs the Power Engagement Mechanism 14 to engage selected Input Gears 24 thru 27.

As shown in FIGS. 2-3, the Lugs 23 of the Power Engagement Mechanism 14 extend through the Roller Guides 16 of the Input Power Shaft Assembly 20 and when appropriately positioned by the Carriage 13 engage selected Input Gears 24 thru 27. In order for the Power Engagement Mechanism 14 to selectively engage Input Gears 24 thru 27 and to precipitate movement of the Power Engagement Mechanism 14 through the Input Gear Cluster 42, the base of the Input Gears 24 thru 27 contains three Lateral Slots 28 which coincide with the placement and dimensions of the Lugs 23. These Lateral Slots 28 provide engagement points for the Lugs 23 or allow passage of the Lugs 23 through the Input Gear Cluster 42 via Clearance Slots 29.

As shown in FIGS. 2-3, alignment of the Lugs 23 with the Lateral Slots 28 of the Input Gears 24 thru 27, also engages the Input Gears 24 thru 27 to the Input Power Shaft Assembly 20. Through the meshing of the Input Gears 24 thru 27 with the Internal Teeth 39 formed into the Gear Platforms 30 thru 33 of the Driven Shell 41, power is transferred from the Input Gears 24 thru 27 to the Driven Shell 41.

As shown in FIGS. 1-2 & 3, power is thus selectively transferred from the Input Power Shaft Assembly 20 to the Driven Shell 41 via th Power Engagement Mechanism 14 and Input Gears 24 thru 27 as directed by the Shifting Assembly 21.

Conventional transmission designs utilize two opposing, conical gear clusters wherein the diameter of the input gear is exceeded by the diameter of the output gear. Said gear set forms one ratio within the transmission. Adjacent gear sets progressively increase the diameter of the input gears while decreasing the diameter of the corresponding output gears, such that the input gear exceeds the diameter of the output gear in the final gear set. Thus, the input and output gear clusters form two inversely proportional, conical drive trains. The inverse variation in diameter of the gear sets of conical drive shafts constitutes an operational principle for the generation of ratios within conventional transmissions.

It has been discovered that each adjacent gear on both the Input Power Shaft Assembly 20, and the Driven Shell 41 beginning with the smallest gear, must increase in diameter. Furthermore, as the circumference of the gears increases, efficiency increases such that an increase in circumference is directly proportional to an increase in efficiency.

While it is not possible to achieve a 1:1 relationship between the input and output gears due to the fact that the axes of rotation of the two drive shafts are spaced apart, it has been discovered that the distance between the axes of the two drive shafts may be varied and the rate of increase of the gear diameters may also be varied to more closely approach a 1:1 ratio.

The number of teeth formed in the Input Gears 24 thru 27 and Gear Platforms 30 thru 33 are related to the increase in circumference. For example, the output Gear Platforms 30 thru 33 could have two, four, or twenty teeth more than the Input Gears 24 thru 27, but the difference between adjacent Gear Platforms 30 thru 33 and adjacent Input Gears 24 thru 27 is the same. For example, each could increase by two teeth or four teeth or the like as shown in Tables I and II below. The gear ratios referred to in said Tables are the output divided by the input. It should also be noted that the number of teeth shown in said Tables is proportional to the circumference, and therefore, the ratio will be the same whether calculated by dividing the numbers of teeth or calculated by the actual circumference, diameter or radius.

TABLE II

|  | 1 | 2 | 3 | 4 | 5 |
|---|---|---|---|---|---|
| Out-put | 12 | 14 | 16 | 18 | 20 |
| In-put | 10 | 12 | 14 | 16 | 18 |
| Ratios | 1.2 | 1.16 | 1.14 | 1.125 | 1.11 |
| Increase in size along shaft: | | | | 2 | |
| Difference in teeth between gears: | | | | 2 | |

TABLE II

|  | 1 | 2 | 3 | 4 | 5 |
|---|---|---|---|---|---|
| Out-put | 30 | 34 | 38 | 42 | 46 |
| In-put | 10 | 14 | 18 | 22 | 26 |
| Ratios | 3.0 | 2.43 | 2.1 | 1.9 | 1.769 |
| Increase in size along shaft: | | | | 4 | |
| Difference in teeth between gears: | | | | 20 | |

As shown in Tables I and II, although both gears of an adjacent pair must be larger than the preceding pair, the gear ratio decreases. The increase in circumference then results in an increase in efficiency along the shafts.

The following is an example of the dimensions for a very compact and small transmission of this invention. For the purposes of the following, GR = the ratio of the input gear to the output gear. I = the effective radius dimension of the input gear, and 0 = the effective radius dimension of the output gear. X = the offset distance between the axis of rotation of the input shaft and the axis of rotation of the output shaft.

$$O - I = C$$
$$GR \times I = O$$
$$I = \frac{X}{GR-1}$$

According to the above formulas, the input gear radius is equal to the offset distance between the Input Power Drum Assembly and the Driven Shell divided by the gear ratio minus 1.

If a gear ratio for a 5th gear is assumed at 1.30, gear ratio for the 1st gear equals 2.0, and input gear radius for the 1st gear is equal to 0.88 inches; the input radius for the 5th gear will equal 2.93 inches, and the following dimensions will pertain (expressed in inches):

TABLE III

| Gear | 1 | 5 |
|------|-------|-------|
| I | 0.88" | 2.93" |
| O | 1.76" | 3.81" |
| GR | 2.0 | 1.30 |
| X | 0.88" | 0.88" |

In Table III, the increase in efficiency designated (GR), is illustrated as a function of the increase in circumference designated (I) over the entire gear range (1) through (5).

Access is provided to Drive Gears 34-35 via Access Ways 37-38 in Case 1.

What is claimed is:

1. A variable speed transmission comprising:
 first and second convergent conical gear trains, wherein said convergent gear trains simultaneously increase in circumference, said first conical gear train serving as a power output member and is an integral conical shells comprising a plurality of stepped gear platforms having internally cut gear teeth arranged conically from the smallest to the largest diameters, said second conical gear train serving as an input member and comprising a plurality of stepped gear platforms having externally cut gear teeth arranged conically from the smallest to the largest diameter, being in meshing engagement with a corresponding gear platform of the first conical gear train, and being eccentrically located within the first conical gear train, wherein a shifting means comprising a shifting control slide is mounted coaxially within the second conical gear train and is tracked to a fixed stabilizing shaft disposed within a hollow helical control drum, whereby said stabilizing shaft prevents inadvertent rotational motion of said slide, such that two carriage indexing pins, integral with said shifting control slide engage double lead helical slots formed in said helical control drum, and being so driven by rotation of said double lead helical slots, aligns the carriage surrounding said helical control drum such that movement in said carriage directs a power engagement mechanism via the carriage indexing pins for selectively engaging one of the gears of the second conical gear train, whereby, the parallel expansion of said convergent cones produces a corresponding efficiency increase such that an increase in circumference is directly proportional to an increase in efficiency.

* * * * *